United States Patent
Baranek

(10) Patent No.: US 6,734,245 B2
(45) Date of Patent: May 11, 2004

(54) HIGH DENSITY METAL OXIDE FILLERS IN RUBBER COMPOUNDS

(75) Inventor: Todd M. Baranek, Akron, OH (US)

(73) Assignee: Bridgestone/Firestone North American Tire, LLC, Nashville, TN (US)

(*) Notice: Subject to any disclaimer, the term of this patent is extended or adjusted under 35 U.S.C. 154(b) by 0 days.

(21) Appl. No.: 09/840,288

(22) Filed: Apr. 23, 2001

(65) Prior Publication Data

US 2002/0193490 A1 Dec. 19, 2002

(51) Int. Cl.$^7$ .............................. C08K 3/04; C08K 3/08
(52) U.S. Cl. ......................... 524/430; 524/495
(58) Field of Search ........................................ 524/430

(56) References Cited

U.S. PATENT DOCUMENTS

| | | | |
|---|---|---|---|
| 1,844,306 A | | 2/1932 | Williams |
| 4,193,474 A | * | 3/1980 | Okubo et al. ............... 181/287 |
| 5,129,919 A | * | 7/1992 | Kalinowski et al. .......... 51/309 |
| 5,644,085 A | * | 7/1997 | Lorraine et al. .............. 73/641 |
| 5,922,464 A | * | 7/1999 | Hayashi et al. ............. 428/403 |
| 6,030,296 A | * | 2/2000 | Morgan et al. ............. 473/361 |

FOREIGN PATENT DOCUMENTS

| | | |
|---|---|---|
| EP | 1 160 275 A1 | 12/2001 |
| EP | 1231079 A1 | 8/2002 |
| GB | 723751 | 2/1955 |
| GB | 828447 | 2/1960 |

OTHER PUBLICATIONS

"Viscoelasticity: A Minimization Balance of Enthalpy and Entropy," Louis F. Gatti, 133$^{rd}$ Meeting of the Rubber Division, American Chemical Society (Apr. 1998).

* cited by examiner

Primary Examiner—Edward J. Cain
(74) Attorney, Agent, or Firm—Meredith E. Palmer; Arthur M. Reginelli

(57) ABSTRACT

The use of high density metal oxide fillers in vulcanizable rubber compounds is disclosed. The use of the fillers reduce or eliminate the need for conventional fillers, such as carbon black or silica, because viscoelastic performance properties of vulcanized rubber compounds with high density metal oxide fillers therein predict improved wet traction and rolling resistance, two key factors in the use of rubber compounds as vehicle tire treads. Methods of making and using such rubber compounds are also disclosed.

11 Claims, 2 Drawing Sheets

HIGH DENSITY METAL OXIDE FILLERS IN RUBBER COMPOUNDS

FIELD OF THE INVENTION

This invention relates to the use of high density metal oxide fillers in rubber compounds.

BACKGROUND OF THE INVENTION

Rubber compounds have progressed from the use of untreated natural rubber to enormously complex polymeric systems, formulated with synthetic elastomeric polymers for such specific uses as vehicle tires, vibration dampers, and other products.

Early in the development of sophisticated rubber products, compounders of rubber products dispersed fillers into various polymers as a means of both providing physical reinforcement and bulk to the elastomeric polymer. Carbon black was the first material commonly used as a filler. Later, silica has become a preferred filler, both alone and in combination with carbon black. Use of silica fillers improves rubber properties such as reducing rolling resistance (measured using polymer physics properties such as hysteresis), increasing road traction (particularly on wet surfaces), and enhancing other properties vital to improved fuel economy for vehicles, whose tires are engineered with tread compounds including such fillers.

While silica-containing rubber compounds have become preferred for tread compounds, the search in the art continues for other materials that can improve these vital vehicle tire performance properties. Consumers, governments, and vehicle manufacturers demand ever-better vehicle tire performance. Tire manufacturers strain to reduce costs of meeting customer expectations.

SUMMARY OF THE INVENTION

What the art needs is another class of fillers for rubber compounding that can be used at least in vehicle tire tread compounding as a substitute for, or an enhancement to, conventional tire fillers, in order to further improve vehicle tire performance at potentially lower costs of manufacture.

Moreover, this need in the art generally exists for any rubber compound which may require specific viscoelastic performance properties that are currently unavailable in commercial rubber compounds. For example, nearly all rubber compounds can benefit from an extension of filler choices in unexpected directions, once the demonstration of specific viscoelastic performance properties is known to those specific rubber compounders for their own specific rubber products.

The present invention solves the problems in the art by providing another class of fillers which can improve rubber compounds ranging from vehicle tire components to rubber hoses to vibration dampers.

One aspect of the present invention is a method of using high density metal oxide fillers in rubber compounds, comprising the steps of (a) selecting a high density metal oxide filler according to its specific performance properties, and (b) introducing the filler into rubber polymers for subsequent mixing to create a vulcanizable rubber compound.

Another aspect of the present invention is a vulcanizable rubber compound, comprising at least one elastomer, including but not limited to natural or synthetic rubber, or blends thereof, and at least one high density metal oxide filler.

Another aspect of the present invention is a vehicle tire component made from the vulcanizable rubber compound identified in the paragraph above.

Another aspect of the present invention is a vehicle tire comprising at least the vehicle tire component identified above.

Another aspect of the present invention is a method of vulcanizing the rubber compound above, comprising the steps of mixing at least one elastomer, comprising a natural or synthetic rubber, and at least one high density metal oxide filler and polymerizing the rubber monomer.

A feature of the invention is the use of a high density metal oxide filler that replaces or augments conventional reinforcement fillers in rubber compounds in a manner that utilizes viscoelastic performance properties of the rubber compound for a specific end use.

An advantage of the invention is the ability of one skilled in the art to select a high density metal oxide filler according to its viscoelastic performance properties for a specific rubber compound for a specific use.

Another advantage of the invention is the possible reduction of cost of manufacture of the rubber compound by reducing the amount of expensive silica coupling agents which conventional silica-filled rubber compounds invariably contain by the reduction of silica required in the rubber compound. Preferably, this reduction aims toward elimination of silica as a reinforcing filler.

"Metal oxide filler" means a chemical composition of a metal and an oxide, where the metal is selected from Groups IVA, VA, IB, VIB, VIIB and VIIIB metals, and reacted with oxygen.

"High density" means a specific gravity of greater than about 5.7 $g/cm^3$ and preferably greater than about 6.5 $g/cm^3$ and most preferably greater than about 8 $g/cm^3$.

Other features and advantages of invention will be disclosed in conjunction with an explanation of the embodiments of the invention in conjunction with the following drawings.

EMBODIMENTS OF THE INVENTION

Elastomers for Rubber Compounds

Figure 1:
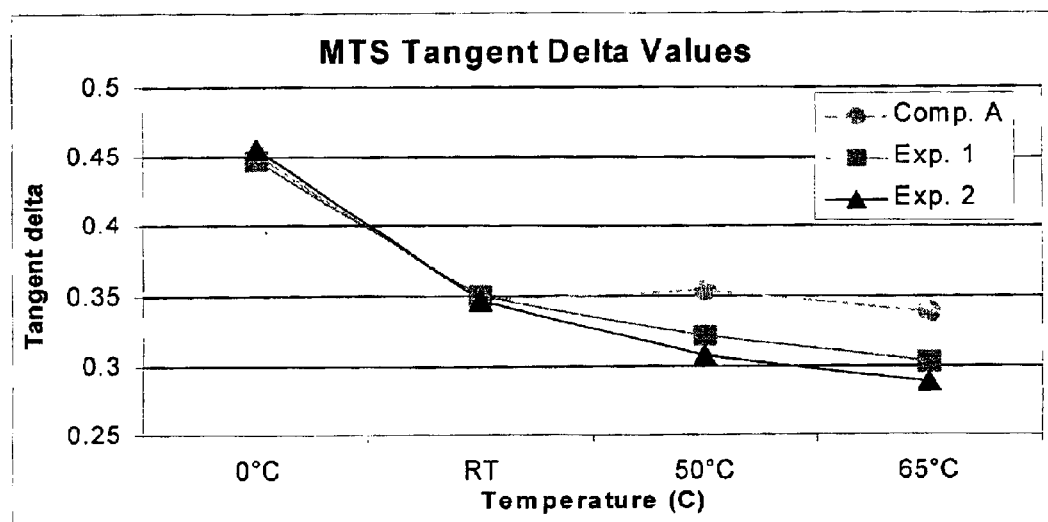
FIG. 1 is a graph of MTS Tangent Delta Values for two examples of the invention in comparison with a prior art compound.

Any conventionally used elastomer for rubber compounding is potentially available for the advantages of the present invention arising from the use of high density metal oxide filler therewith.

Non-limiting examples of elastomers potentially useful in the present invention include the following, individually as well as in combination, according the desired final viscoelastic properties of the rubber compound: Natural Rubber (Hevea and Guayule), Polyisoprene Rubber, Styrene Butadiene Rubber, Polybutadiene Rubber, Butyl Rubbers, Halobutyl Rubbers, Ethylene Propylene Rubbers, Crosslinked Polyethylene, Neoprenes, Nitrile Rubbers, Chlorinated Polyethylene Rubbers, Silicone Rubbers, Specialty Heat & Oil Resistant Rubbers, Other Specialty Rubbers, and Thermoplastic Rubbers, as such terms are employed in *The Vanderbilt Rubber Handbook,* Thirteenth Edition, (1990).

Preferred elastomers include natural rubber, isoprene, styrene-butadiene copolymers, and butadiene rubber because of their common usage in the tire industry.

The ratios (often expressed as adding up to 100 parts) of such polymer blends can range across the broadest possible range according to the need of final viscoelastic properties desired for the polymerized rubber compound. One skilled in the art, without undue experimentation, can readily determine which elastomers in what amount is appropriate for a resulting desired viscoelastic property range, which can then be improved by the selection of the novel fillers according the teachings of the present invention. For example, one skilled in the art need only to look to the vast body of patent literature on rubber compounding as used in the vehicle tire industry to find suitable combinations and amounts of elastomers for preparation of vulcanizable rubber compounds for a variety of rubber components assembled into an uncured (so-called "green") tire for final vulcanization that cures the tire by crosslinking, principally using sulfur crosslinks.

More specifically, the tire industry often selects styrene and butadiene copolymers in ratios ranging from about 0 percent styrene to about 80 percent styrene, and preferably from about 0 to about 45 percent styrene for rubber tire tread compounds. Tread compounds are near the top of any list for viscoelastic performance properties because of the road contact such compounds have and the balance of rolling resistance and traction on wet, ice and snow covered surfaces such rubber compounds should have.

Commercially available sources for natural rubber and synthetic rubber are very well known to those skilled in the art, but special mention is given to Firestone Polymers of Akron, Ohio, USA as a source of both natural rubber in latex form and synthetic polymers used in the rubber industry.

High Density Metal Oxide Filler

According to the definitions of High Density and Metal Oxide above, the selection of novel fillers according to the present invention is based on desired viscoelastic performance properties.

Expressed as an empirical formula, such high density metal oxides can be:

I. $M_n(O)_{2n}$

II. $M_n(O)_{3n/2}$

III. $(M_1)_n(M_2)_n(O)_{2n}$ where M is a metal selected from Groups IVA, VA, IB, VIB, VIIB and VIIIB metals; O is oxygen; and n is the valence of the metal.

Non-limiting examples of high density metal oxide compositions include bismuth oxides, phosphorous oxides, tin oxides, copper oxides, and iron/manganese tungsten oxides. Depending on the valence of the metal involved, there can be multiple oxide candidates for a given metal.

Preferably, the filler is bismuth trioxide.

The amount of high density metal oxide filler to be mixed into the vulcanizable rubber compound depends on the presence or absence of other fillers, as well as the desired physical properties of the resulting compound. The amount of metal oxide filler ranges from about 0 to about 150 phr, and preferably from about 5 to about 80 phr (parts per hundred rubber—where "hundred rubber" means 100 parts of elastomer(s)).

High density metal oxides are fine chemicals commercially available from numerous sources. The use of Internet, Chemical Catalogs, and Technical Literature will quickly reveal such sources. Special mention is made of The Shepherd Chemical Company of Cincinnati, Ohio, USA; the American International Chemical Company of Natick, Mass., USA; and Atomix, Inc. of Hohokus, N.J., USA as sources of bismuth trioxide.

Additional and Optional Ingredients

The sophistication of rubber chemistry has developed a vast body of choices for one skilled in the art to select elastomers, fillers, curing packages, processing aids, antioxidants and antiozonants, coupling agents, and the like. Without undue experimentation and utilizing the patent and technical literature, one skilled in the art can develop a variety of specific vulcanizable rubber compounds for subsequent construction and vulcanization according to the specific rubber product desired.

For example, without limitation, a tire tread compound typically also contains elastomers, fillers, processing oils/aids, antidegradants, zinc oxide, stearic acid, sulfur, accelerators and coupling agents. Such compound can have such additional ingredients in the following amounts:

fillers: from about 0 to about 150 phr, and preferably from about 30 to about 80 phr;

processing oils/aids: from about 0 to about 75 phr, and preferably from about 0 to about 40 phr;

antidegradants: from about 0 to about 10 phr, and preferably from about 0 to about 5 phr;

stearic acid: from about 0 to about 5 phr, and preferably from about 0 to about 3 phr;

zinc oxide: from about 0 to about 10 phr, and preferably from about 0 to about 5 phr;

sulfur: from about 0 to about 10 phr, and preferably from about 0 to about 4 phr;

accelerators: from about 0 to about 10 phr, and preferably from about 0 to about 5 phr; and coupling agent: from about 0 to about 30 phr, and preferably from about 5 to about 15 phr.

Method of Making Vulcanizable Rubber Compound

In the more than 100 years of rubber compounding of tires for the automobile industry, very sophisticated and capital intensive equipment has been built to produce such rubber products at the lowest possible cost. However, such rubber products can also be produced on the bench scale or in pilot plants. Therefore, one skilled in the art has another vast variety of choices to make the rubber compound for subsequent vulcanization.

Specifically, without limitation, an open mill or Banbury type mixer is usually employed to mix the elastomeric ingredients, the fillers, the additives, etc.

Such mixing usually occurs in stages, during which ingredients may or may not be added. In the case of mixing a tire tread compound, typically the mixing process is comprised of a masterbatch initial mixing stage, followed by additional non-productive mixing stage(s), and ending with a final, productive (curative containing) mixing stage.

Typically, ingredients such as elastomers, fillers, oils and processing aids, antioxidants and antiozonants, zinc oxide and stearic acid, are added during the initial masterbatch. The initial masterbatch may be followed by another masterbatch, in which additional fillers and additives are added, or a non-productive mix stage in which no ingredients are added. Non-productive mix stages during which no ingredients are added may be used to further disperse fillers and other ingredients within the elastomer, or to decrease the viscosity of the mixed rubber compound.

A final mixing stage is then employed, during which curatives, including accelerators, and additional processing aids and antioxidants/antiozonants may be added. This final mix may also be followed by a non-productive mixing stage in which no ingredients are added. Again, one skilled in the art should not have the need for undue experimentation to select the most appropriate type of mixing to achieve a vulcanizable rubber compound according to the present invention.

Method of Assembly and Crosslinking the Rubber Compound

The rubber and tire industry has developed manual, semi-automated, and fully-automated means of manufacturing rubber products.

In the case of vehicle tires, the means are usually semi-automated and well documented in the literature. Multiple types of different rubber compounds (sidewall rubbers, innerliner rubbers, bead filler rubbers, body ply rubbers, skim stock rubbers and tread rubbers) are assembled along with rubber-coated metal beads and metal plies to form a conventional vehicle tire. The selection of specific metal alloys and elastomeric compounds, and the configuration and dimensions of the various metallic and elastomeric components is also well understood by those skilled in the art of tire building.

The assembly of the rubber "green" tire is followed by curing in a press mold to concurrently crosslink the elastomeric components and mold the elastomeric components into a final tire. Vulcanization techniques are also well known.

The assembly and final production steps of other rubber products are also well known. One skilled in the art can readily find such information in the paper and electronic literature.

Usefulness of the Invention

The selection of a high density metal oxide filler to reduce or eliminate the use of conventional fillers in rubber compounds produces unexpected viscoelastic properties.

In the art of rubber compounding for the tire industry, certain physical tests of the rubber compound are used as predictors of cured tire properties. Tangent δ at 0° C. is an indicator of wet traction, such that increases in tangent δ at 0° C. correlate to improved wet traction of a cured tread compound. Tangent δ at 65° C. is a predictor of rolling resistance, such that lower results when compared to a control are indicative of decreased rolling resistance. Percent rebound at both 0° C. and 65° C. are predictors of wet traction and rolling resistance of the tread compound, as well. Lower percent rebound of a compound at 0° C., when compared to a control, is indicative of increased hysteresis, which corresponds to increased wet traction properties. Likewise, increased percent rebound at 65° C. when compared to a control compound is indicative of lower rolling resistance.

Tangent δ at room temperature data may be used to predict the dry traction of a tread rubber compound. An increase in this data corresponds to an increase in dry traction. As a predictor of snow traction, lower 100% modulus at −5° C. when compared to a control compound indicates increased snow traction.

With these viscoelastic properties, one can predict that high density metal oxide fillers are capable of producing consistently better rolling resistance for tire tread compounds while maintaining or improving wet traction, as compared with controls which contain carbon black or silica as reinforcement fillers. Prediction of dry traction using viscoelastic indicators is no less than slightly lower than such controls. Prediction of cold traction using dynamic and static modulus values is better than the controls.

While not being limited to a particular theory, the use of high density metal oxide fillers in rubber compounds addresses a problem that conventional fillers have, namely: the effects of a competition of enthalpy vs. entropy in macromolecular systems. As identified by Louis F. Gatti in "Viscoelasticity: A Minimization Balance of Enthalpy and Entropy" Paper No. 31, Rubber Division $133^{rd}$ Meeting of the American Chemical Society in Dallas, Tex., USA, Apr. 19–22, 1988, polymer systems are apt to take a "wrong turn" in configuration at high energy levels. Local entropy is reduced by reducing the number of possible configurations, which increases the energy level of the polymer system. With more "wrong turns", higher energy levels result. It was hypothesized that hindrance effects were related to filler density.

In this invention, the partial or total replacement of conventional fillers with a high density filler results in improved physical properties of the rubber compound. In this manner and quite unexpectedly, use of a high density metal oxide filler will improve both wet traction and rolling resistance of tire tread rubber compounds.

Further embodiments of the invention are described in the following examples.

EXAMPLES

General Experimental Testing Procedures

1. Modulus, Tensile Strength and Elongation at Break

Modulus, Tensile Strength (Stress at Maximum Strain) and Elongation at Break are measured generally according to ASTM D 412 (1998) method B. Vulcanized rubber test specimens are cut into the shape of a ring, using a D412 B Type 1 die. The measurements for the above properties are based on the original cross sectional area of the test specimen. An instrument equipped to produce a uniform rate of grip separation, such as an Instron tensile tester, with a suitable dynamometer and an indicating or recording system for measuring applied force is used in conjunction with a measurement of extension of the test specimen. Modulus (100% (M100) and 300% (M300)), tensile strength (TB) and elongation (EB) are calculated according to the calculations set forth in ASTM D412 (1998).

2. Rebound

Rebound, the resilience of a rubber sample based on the ratio of returned to delivered energy, is measured generally according to test method ASTM D1054-91 (2000). A rubber sample is milled and cured according to ASTM D 1054, using the mold specified. The cured sample is then coated with talc, prior to conditioning. The sample is conditioned in an oven set at the requested temperature for approximately 1 hour. The conditioned sample is placed into a Zwick type rebound tester, such that a pendulum is swung against the sample, and the angle which it bounces back is measured. The percentage rebound is calculated using the equation found in D1054-91(2000).

3. MTS

MTS measures the dynamic spring rate and damping characteristics of a rubber sample. The sample is subjected to a vibration at a specified load, frequency, temperatures and deflection. The elastic spring rate (K') and damping coefficient (C) are then determined using the following formulae:

$$F(t)=K'x+Cx^*$$  I.

where:

F(t)=applied force

K'=elastic spring rate (lb/in)

x=displacement (inch)

C=damping coefficient (lb sec/in) or the per cycle dissipation energy x*=change in displacement with respect to time The viscous spring rate (K') can be calculated by using the damping coefficient:

$$K'=2\pi f C$$  II.

where:

f=the frequency of the vibration

Additionally, tan δ can be calculated from the spring rate data, using the following formula:

$$\tan \delta = K''/K'$$

Rubber samples of 2.22 cm in diameter and 1.90 cm in height are cured in an MTS mold. An MTS 830 elastomer test system is used in conjunction with a 458.20 micro console and an MTS 409.80 temperature controller to analyze the test specimen. For the following Examples, the samples were preconditioned by cycling at the set frequency and temperature for a period of 2 minutes. The testing conditions, at various temperatures, used for the following Examples are shown in Table 1.

TABLE 1

| MTS Test Conditions | 0° C. | RT | 50° C. | 65° C. |
|---|---|---|---|---|
| Preload (kg) | 22.7 | 11.3 | 4.5 | 4.5 |
| Frequency (Hz) | 10 | 10 | 10 | 10 |
| Deflection (%) | 2 | 5 | 5 | 5 |

General Experimental Materials Examples

In these Examples, a high density metal oxide filler is used as a partial replacement to conventional reinforcing rubber fillers.

For the following Examples, bismuth trioxide is used to replace varying amounts of carbon black in both carbon black filled and carbon black and silica filled rubber compounds.

Examples 1 and 2 and Comparative Example A

Comparative Example A (Comp. A) was representative of a carbon black filled tread compound. Experimental Examples 1 and 2 (Exp. 1 and Exp.2) were modified versions of this compound. In Example 1, 10 phr of carbon black was replaced by an equivalent amount of bismuth trioxide. In Example 2, 10 phr of carbon black is replaced with 17 phr of bismuth trioxide, while additional aromatic oil is also added to the composition.

Each of Comparative Example A, and Experimental Examples 1 and 2 were mixed in three mix stages. For the first non-productive mix stage, the ingredients were mixed for approximately 180 seconds to a temperature of about 177° C. The rubber compound was then removed from the mixer, and was subsequently mixed with additional filler in a second non-productive mix stage. During this second mix stage, the ingredients were mixed for approximately 110 seconds, to a temperature of about 160° C. The resulting rubber composition was then mixed with sulfur curatives, accelerators, and additional anti-oxidants to a maximum temperature of about 99° C., for about 95 seconds, in a final, productive mix stage.

The rubber compositions of this set of Examples were comprised of ingredients listed in Table 2.

TABLE 2

| Materials | Comp. A | Exp. 1 | Exp. 2 |
|---|---|---|---|
| Masterbatch #1 | | | |
| Emulsion SBR[1] | 137.5 | 137.5 | 137.5 |
| Processing Oil[2] | 17 | 17 | 22 |
| Wax[3] | 1 | 1 | 1 |
| Carbon Black[4] | 65 | 55 | 55 |
| $Bi_2O_3$[5] | 0 | 10 | 17 |
| Zinc Oxide | 1.7 | 1.7 | 1.7 |
| Stearic Acid | 1 | 1 | 1 |
| Masterbatch #2 | | | |
| Carbon Black[4] | 20 | 20 | 20 |
| Final | | | |
| Sulfur | 1.8 | 1.8 | 1.8 |
| Antidegradant[5] | 0.95 | 0.95 | 0.95 |
| DPG[6] | 0.4 | 0.4 | 0.4 |
| TBBS[7] | 1.15 | 1.15 | 1.15 |
| MBTS[8] | 0.4 | 0.4 | 0.4 |

[1]Emulsion polymerization prepared, oil extended styrene/butadiene rubber available as Ameripol Synpol 1712H, from Ameripol-Synpol Corp.;
[2]Aromatic processing oil, available as Textract 2205 from Texaco;
[3]Available as Okerin 1875 from Astor Wax Corp.;
[3]N234 type carbon black;
[4]Bismuth Trioxide having a specific gravity of approximately 8.3, available from The Sheperd Chemical Company.;
[5]Available as Santoflex 13 from Flexsys;
[6]Perkacit DPG, available from Flexsys;
[7]Santocure TBBS, available from Flexsys;
[8]Perkacit MBTS, available from Flexsys;

Each of the Examples was then vulcanized at a temperature of about 170° C. for about 15 minutes. The physical properties for the resulting vulcanized rubber compositions are shown in the following Table 3.

TABLE 3

| | Comp. A | Exp. 1 | Exp. 2 |
|---|---|---|---|
| MTS | | | |
| Tan δ @ 0° C. | 0.452 | 0.448 | 0.456 |
| K' @ RT | 1204 | 1224 | 1163 |
| Tan δ @ RT | 0.347 | 0.349 | 0.347 |
| Tan δ @ 65° C. | 0.338 | 0.302 | 0.288 |
| Stress/Strain | | | |
| M300 @ RT | 7.3 | 7.9 | 7.6 |
| TB @ RT | 17 | 18.8 | 17.6 |
| EB @ RT | 570 | 552 | 539 |
| M100 @ -5° C. | 4.05 | 3.53 | 3.36 |
| Zwick Rebound, % | | | |
| 0° C. | 19.4 | 20.2 | 20.4 |
| RT | 27.1 | 30.8 | 30.9 |
| 65° C. | 36.7 | 41.5 | 42.6 |
| 100° C. | 41.9 | 49.8 | 51.1 |

As a predictor of wet traction, the comparison of tangent δ (tan δ) at 0° C. results indicate that the replacement of bismuth trioxide in a carbon black filled tread compound will not significantly affect the wet traction performance of this compound. Tangent δ data derived from MTS testing is also useful for predicting rolling resistance, as explained above. Tangent δ at 65° C. for the modified compositions decreased, indicative of a lower rolling resistance.

These results, illustrated in FIG. 1, which is a plot of tangent δ versus temperature, are surprising in that improving wet traction of a rubber compound usually results in a negative increase in rolling resistance, or vice versa.

Figure 2:
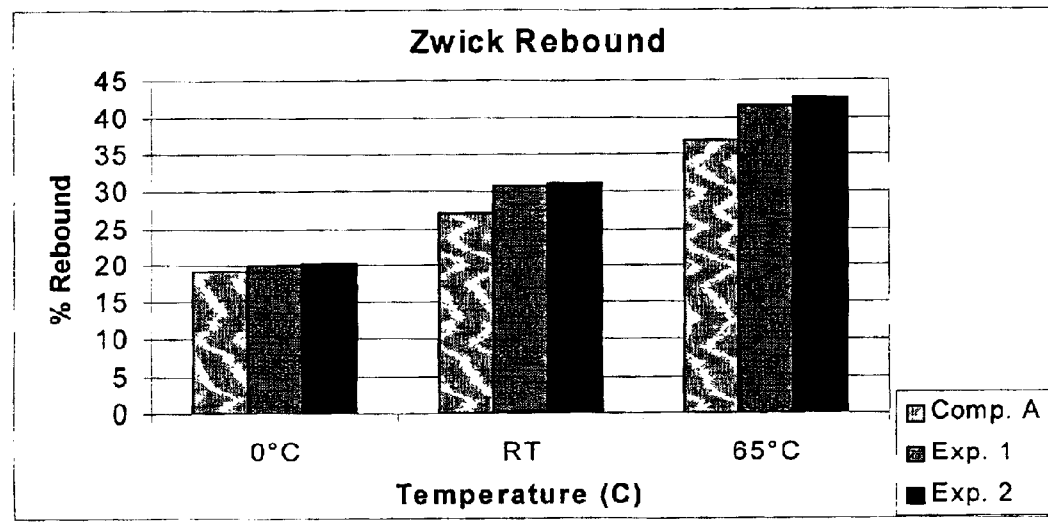
FIG. 2 is a graph of Zwick Rebound Values for two examples of the invention in comparison with a prior art compound.

These predictions are also supported by the % rebound data. As a percentage, rebound of the modified rubber compositions at 0° C., also a predictor of wet traction remained essentially equivalent to the control compound, Comparison Example A. Percent Rebound at 65° C., an indicator of rolling resistance, increased when carbon black was replaced equivalently with bismuth trioxide. Such an increase corresponds to an decrease in rolling resistance of the tread compound. The increase in percent rebound at 65° C. was even greater for Example 2, in which carbon black was replaced with a disproportionately high amount of bismuth trioxide. These results are further displayed in FIG. 2, in which the percent rebound at various temperatures of Exp. 1 and Exp. 2 are compared to the percent rebound of the control.

Examples 1 and 2 also show that 100% modulus at −5° C. were lower than for Comparative Example A. Lower 100% modulus at −5° C. indicates improved cold traction for the tread compound. Additionally, the higher tangent δ at room temperature values for the Examples 1 and 2 indicate improved dry traction of those compounds when compared to the control. The remaining stress strain data contained in Table 3 indicates that these properties were not significantly affected by the replacement and addition of bismuth trioxide to the tread rubber composition.

Examples 3 and 4 and Comparative Example B

Comparative Example B is a tread compound containing both carbon black and silica as reinforcing fillers. In Example 3, when compared to Comparative Example B, the amount of carbon black used is reduced by 5 phr, and 6 phr of bismuth trioxide is added to the rubber composition. In Example 4, the amount of carbon black is reduced by 8 phr comparatively, and the amount of bismuth trioxide added to the composition is 10 phr. The softener content is not adjusted in either of Examples 3 or 4.

The compositions in this set of Examples were mixed in four mix stages. For the first non-productive mix stage, the ingredients were mixed for approximately 280 seconds to a temperature of about 177° C. The rubber compound was then removed from the mixer, and was subsequently mixed with additional filler in a second non-productive mix stage. During this second mix stage, the ingredients were mixed for approximately 200 seconds, to a temperature of about 143° C. A third, non-productive mix stage follows, in which no new ingredients were added to the rubber composition. The rubber compound is mixed at about 143° C., for approximately 90 seconds. During the fourth and final, productive mix stages, the rubber composition was then mixed with sulfur curatives, accelerators, and additional anti-oxidants to a maximum temperature of about 99° C., for about 90 seconds.

The rubber compositions of this Example are comprised of ingredients listed in Table 4.

TABLE 4

| Materials | Comp. B | Exp. 3 | Exp. 4 |
|---|---|---|---|
| Masterbatch #1 | | | |
| Emulsion SBR[1] | 116.88 | 116.88 | 116.88 |
| BR[2] | 15 | 15 | 15 |
| Processing Oil[3] | 3.6 | 3.6 | 3.6 |
| Wax[4] | 0.2 | 0.2 | 0.2 |
| Carbon Black[5] | 28.75 | 23.75 | 20.75 |
| Silica[6] | 40 | 40 | 40 |
| $Bi_2O_3$[7] | 0 | 6 | 10 |
| Zinc Oxide | 2.5 | 2.5 | 2.5 |
| Stearic Acid | 1 | 1 | 1 |
| Antidegradants[8] | 0.95 | 0.95 | 0.95 |
| Coupling Agent[9] | 5.87 | 5.87 | 5.87 |
| Masterbatch #2 | | | |
| Carbon Black[5] | 20 | 20 | 20 |
| Remill | — | — | — |
| Final | | | |
| Sulfur | 2.3 | 2.3 | 2.3 |
| DPG[10] | 0.6 | 0.6 | 0.6 |
| CBS[11] | 0.7 | 0.7 | 0.7 |
| MBTS[12] | 0.7 | 0.7 | 0.7 |

[1]Emulsion polymerization prepared, oil extended styrene/butadiene rubber, available as Ameripol Synpol 1721 from Ameripol-Synpol Corp.;
[2]Budadiene rubber available as Kumho BR01 from Korea Kumho Petrochemical Co., LTD.;
[3]Aromatic processing oil, available as Sundex 790T from Sun Refining & Marketing Co.;
[4]Available as Okerin 1875 from Astor Wax Corp.;
[5]N234 type carbon black;
[6]VN3 type silica available from Degussa AG.
[7]Bismuth Trioxide having a specific gravity of approximately 8.3, available from The Sheperd Chemical Company.;
[8]Of the dialkyl paraphenylene diamine type;
[9]Bis (3-triethoxysilylpropyl) disulfide, available as Si75 from Degussa Corp.;
[10]Perkacit DPG, available from Flexsys;
[11]Santocure CBS, available from Flexsys;
[12]Perkacit MBTS, available from Flexsys;

Each of the rubber compositions was vulcanized at a temperature of about 170° C. for about 15 minutes. The physical properties for the resulting vulcanized rubber compositions are shown in the following Table 5.

TABLE 5

| | Comp. B | Exp. 3 | Exp. 4 |
|---|---|---|---|
| MTS | | | |
| Tan δ @ 0° C. | 0.433 | 0.490 | 0.538 |
| K' @ RT | 1679 | 1637 | 1561 |
| Tan δ @ RT | 0.332 | 0.331 | 0.334 |
| Tan δ @ 65° C. | 0.294 | 0.274 | 0.267 |
| Stress/Strain | | | |
| M300 @ RT | 11.3 | 10.4 | 10.5 |
| TB @ RT | 17.4 | 18.1 | 19.3 |
| EB @ RT | 433 | 467 | 483 |
| M100 @ −5° C. | 10.5 | 10.1 | 9.7 |
| Zwick Rebound, % | | | |
| 0° C. | 12.4 | 11.8 | 11.2 |
| RT | 22.8 | 24.0 | 24.6 |
| 65° C. | 38.4 | 41.6 | 43.7 |
| 100° C. | 48.0 | 51.6 | 53.0 |

The tangent δ at 0° C. from Table 4 shows an increase in values for Examples 3 and 4 when compared to Example B. This trend indicates that the replacement of bismuth trioxide for a portion of carbon black comprising a carbon black and silica filled tread compound results in an increase in wet traction for that tread compound. As a predictor of rolling resistance, tangent δ at 65° C. for the modified compositions decreased, indicating a lower rolling resistance.

Figure 3:
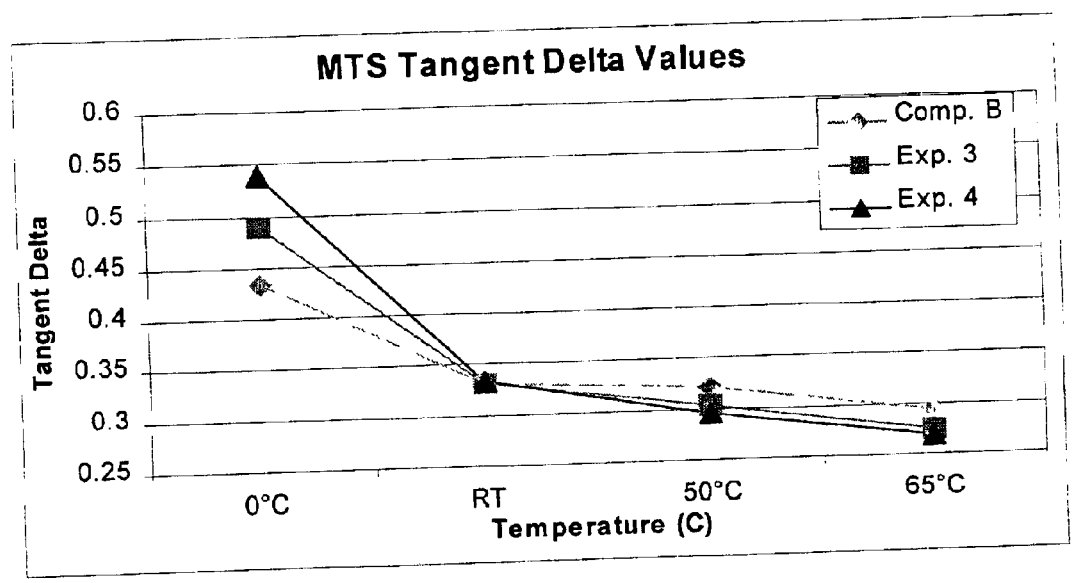
FIG. 3 is a graph of MTS Tangent Delta Values for two other examples of the invention in comparison with a second prior art compound.

These results, illustrated in FIG. 3, which is a plot of tangent δ versus temperature, are quite unexpected.

Figure 4:
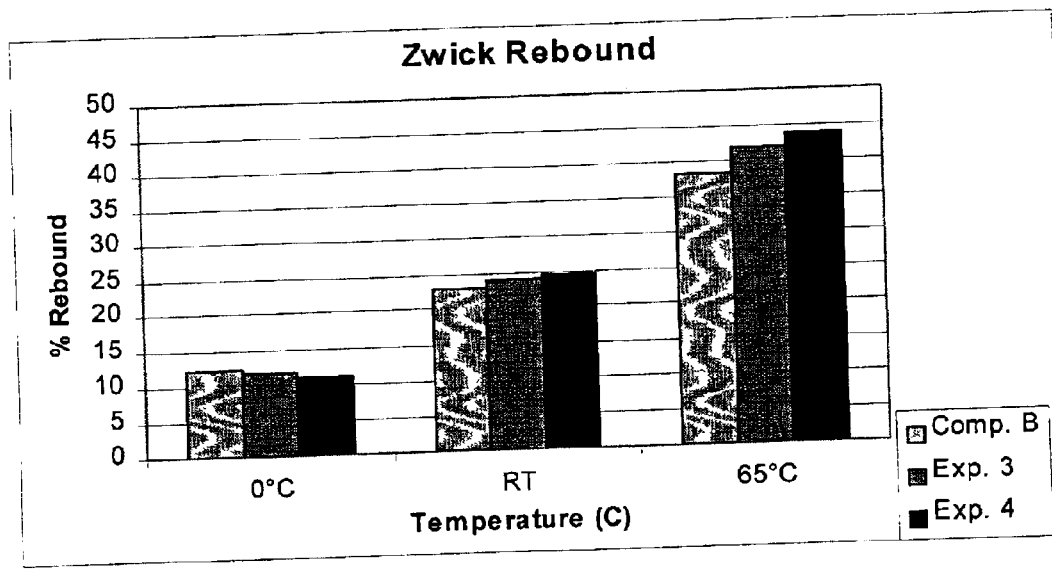
FIG. 4 is a graph of Zwick Rebound Values for two other examples of the invention in comparison with a second prior art compound.

These predictions are also supported by the % rebound data. As a percentage, rebound of the modified rubber compositions at 0° C., also a predictor of wet traction, decreased for Examples 3 and 4, when compared with Example B. Percent rebound at 65° C., increased when carbon black was replaced equivalently with bismuth trioxide, indicating a decrease in rolling resistance. These results are illustrated in FIG. 4, in which the percent rebound at various temperatures of Examples 3 and 4 are compared to the percent rebound for Example B.

Additionally, Examples 3 and 4 also show that 100% modulus at −5° C. results were lower than Comparative Example B, indicating improved cold traction for the tread compound. Also, the higher tangent δ at room temperature values for the experimental examples indicate improved dry traction of those compounds when compared to the control. The remaining stress strain data contained in Table 5 indicates as well, that these properties were not significantly affected by the replacement and addition of bismuth trioxide to the tread rubber composition.

The invention is not limited to the above embodiments. The claims follow.

What is claimed is:

1. A rubber compound for tire treads, the composition comprising:

at least one elastomer;

from about 5 to about 80 parts by weight bismuth trioxide per 100 parts by weight elastomer; and from about 30 to about 80 parts by weight carbon black per 100 parts by weight elastomer, where the carbon black is a tread-trade carbon black.

2. A rubber composition for tire treads, the composition comprising:

an elastomer;

from about 5 to about 80 parts by weight bismuth trioxide per 100 parts by weight elastomer; and from about 30 to about 80 parts by weight carbon black per 100 parts by weight elastomer, where the carbon black is a tread-grade carbon black.

3. A method for reducing the hysteretic loss of rubber vulcanizates that are used for tire treads, the method comprising:

mixing an elastomer, a tread-grade carbon black, bismuth trioxide, and a vulcanizing agent to form a tread compound;

fabricating the tire compound into a green tread;

building a green tire by including the green tread; and curing the green tire.

4. An improved tire tread of the type that includes a vulcanized rubber having dispersed therein a tread-grade carbon black, the improvement comprising the presence of bismuth trioxide dispersed within the vulcanized rubber.

5. The rubber composition of claim 2, where the bismuth trioxide has a density of greater that 5.7 g/cm$^3$.

6. The method of claim 3, where the bismuth trioxide has a density of greater that 5.7 g/cm$^3$.

7. The tire tread of claim 4, where the bismuth trioxide has a density of greater that 5.7 g/cm$^3$.

8. The rubber composition of claim 2, further comprising silica filler.

9. The method of claim 3, wherein said step of mixing includes mixing silica.

10. The tire tread of claim 4, wherein the tire tread is of the type that further includes silica dispersed therein.

11. A rubber composition for tire treads, the composition comprising:

an elastomer;

from about 5 to about 80 parts by weight bismuth trioxide per 100 parts by weight elastomer; and from about 30 to about 80 parts by weight carbon black per 100 parts by weight elastomer, where the carbon black has a surface area of about 119 m$^2$/g.

* * * * *